Oct. 1, 1940.  A. O. GROOMS  2,216,589
REFRIGERATING APPARATUS
Filed June 28, 1937
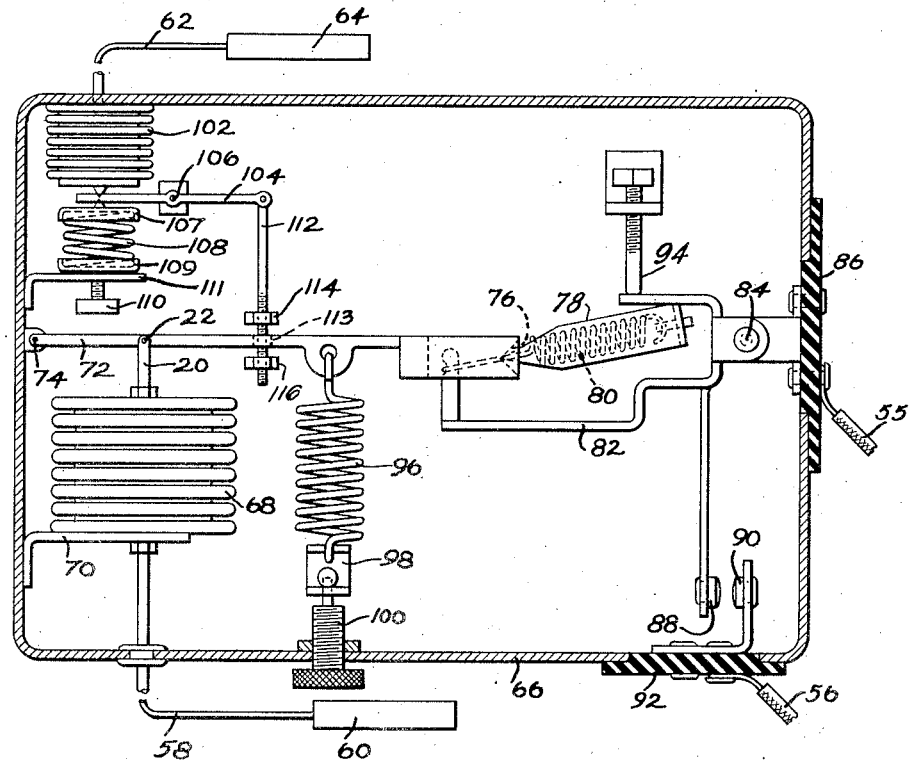
INVENTOR
Albert O. Grooms
BY
Spencer Hardman and Fehr
ATTORNEYS Patented Oct. 1, 1940

2,216,589

UNITED STATES PATENT OFFICE 2,216,589

REFRIGERATING APPARATUS

Albert O. Grooms, Dayton, Ohio, assignor to General Motors Corporation, Dayton, Ohio, a corporation of Delaware Application June 28, 1937, Serial No. 150,678

7 Claims. (Cl. 62—2)

This invention relates to refrigerating apparatus and more particularly to a dual type of control means suitable for use in controlling refrigerating apparatus and other devices.

In household refrigerators the refrigerating system is not only called upon to cool the food compartment of the refrigerator but also to freeze ice cubes and comestibles. For simplicity, a single refrigerating system is used for these dual purposes; and, in order to mantain proper control over the freezing function of the refrigerating system, the control of the system has been by evaporator temperature. Under average conditions, this is fairly satisfactory; but under adverse conditions, such as when the room temperature is excessively high or abnormally low, it has been found that the food compartment becomes too warm in the first instance and too cool in the second instance.

Such a condition is not confined to household refrigerators, however, but also to air conditioning systems where the control is ordinarily by the temperature of the room. However, rooms ordinarily vary considerably in temperature; and it is sometimes desirable to modify such a control by an outside temperature control. This is particularly desirable in air cooling where it is considered best to vary the room temperature according to the outside temperature in order to prevent too great a shock to persons going outside.

Such dual control means are not broadly new; however, in most of these devices either the cut-in or cut-out point alone is changed or both the cut-in and the cut-out points are changed.

It is an object of my invention to provide a control means wherein the auxiliary control will change one of the points under one set of abnormal conditions, while the other point will be changed under the opposite set of abnormal conditions.

It is another object of my invention to provide a control means having a main operating means for controlling a device and a secondary operating means which will not interfere with the first operating means within certain ranges; but, beyond such a range, it will modify the control and the action of the first modifying means.

Further objects and advantages of the present invention will be apparent from the following description, reference being had to the accompanying drawing, wherein a preferred form of the present invention is clearly shown.

In the drawing the figure is a diagrammatic representation of one form of control means embodying my invention.

I have shown a switch provided with a bellows connected to a thermostat bulb and acting upon a primary lever which in turn is pivotally connected to a secondary lever which, with a spring and still a third lever, constitutes a double toggle snap-acting mechanism for opening and closing a set of switch contacts. A second bellows connected with a thermostat bulb and charged with a volatile fluid operates upon a lever which is connected to a rod passing freely through an aperture in the primary lever and having nuts on opposite sides of the aperture so that, when the rod is moved a certain distance by the second bellows, one of the nuts will be moved into the path of movement of the primary or main lever. A spring means opposes the expansion of each of the bellows and an adjustment is provided for each of the spring means.

Referring now more particularly to the drawing for a more complete disclosure of the control means, there is shown a casing 66 and a thermostatic bulb 60 outside of the casing connected by a tube 58 to the fixed end of a metal bellows 68 which is mounted upon a platform 70 extending from the side wall of the casing 66. The free end of the bellows 68 is connected by the member 20 and a loose pivot 22 to a primary lever 72 provided with a pivot 74 upon the wall of the casing. This primary lever 72 is provided with a pair of notches 76 at its opposite end which receive the knife edges formed upon adjacent ends of the secondary lever 78. This secondary lever 78 is connected by a tension toggle spring 80 to a contact carrying lever 82 pivoted upon the pivot pin 84 to an insulated portion 86 of the wall of the control casing 66. This lever 82 is provided with a contact 88 which cooperates with a contact 90 mounted upon an insulated portion 92 of the casing 66.

The contact 90 is connected by the conductor 56 to one of the conductors of a control circuit while the pivot pin 84 is connected electrically by a conductor 55 to another of the conductors of a control circuit. The movement of the lever 82 is controlled in the one direction by the contact 90 and in the opposite direction by a set screw 94 which may be moved to change the range of movement of the lever 82 and, in that way, to change the differential of the switch. The range control of the switch is provided by a tension spring 96 connected at one end to the lever 72 and at its opposite end through a connector 98 to an adjusting screw 100 which is provided for adjusting or changing the range of the switch as desired.

The portion of the control means thus far described provides a control which controls the operation of the refrigerating system and the temperature of the evaporating means directly according to the temperature of the evaporating means in a household refrigerator. This portion of the control means, when used for other purposes, may be responsive to room temperature or cooling unit temperature or radiator temperature or the temperature of a supply of warm or cold air for tempering air in a room.

I have provided a novel form of additional or compensating control in my control means which includes the thermostatic bulb 64 and the tube 62 which are connected to the bellows 102 mounted upon the wall of the casing 66. This bellows 102 acts upon a lever 104 pivoted at 106 to a projection extending from the wall of the casing. The expansion of the bellows 102 is controlled by a compression spring 108 which has its tension controlled by an adjusting screw 110 provided for changing a compensating effect of the bellows 102, the tube 62, and the thermostat 64 which preferably contains a volatile liquid or some sort of thermally expansible fluid.

This adjusting screw 110 is threaded through a platform or extension 111 and bears against a spring retainer 109 provided at one end of the spring 108. A second spring retainer 107 is provided which bears against the lever 104 directly opposite the bellows 102. At the free end of the lever 104 there is pivotally connected a rod 112 which has a threaded portion extending through an aperture 113 in the primary lever. The aperture 113 is sufficiently large to permit a rod 112 to pass freely through it. This rod 112 is provided with nuts 114 and 116 on either side of the primary lever 72.

When this control is used in a household refrigerator, these two nuts 114 and 116 are spaced far enough apart so that, when the thermostat bulb 64 is responsive to the temperature of the air within the food compartment of a household refrigerator and the temperature of the air within the food compartment is within the desirable range, such as between 42 and 45° F. or possibly between 40 and 50° F., these nuts 114 and 116 are entirely out of the path of the primary lever 72; and, under such conditions, the refrigerating system is controlled altogether according to evaporator temperature. Thus, should the temperature within the food compartment become too cold such as the low 40 or 42° F., the bellows 102 will contract and move the nut 114 into the path of the primary lever 72 so as to prevent or tend to prevent the primary lever from being moved upwardly a sufficient distance to trip the toggle in the circuit-closing position. Thus, the operation of the electric motor and the compressor would be stopped if they were in operation or they would be prevented from starting when not in operation under such conditions.

If the temperature of the air in the food compartment should become too warm, the bellows 102 will expand and move the nut 116 into the path of the primary lever so as to prevent or tend to prevent the primary lever 72 from moving a sufficient distance in the downward direction to cause the toggle mechanism to trip the contacts to open-circuit position. Thus, when the temperature within the food compartment rises above 45 or 50° F., the electric motor and the compressor will either be started or made to discontinue operation.

If the thermostat 64 is placed outside of the refrigerator so that it is in heat exchange relation or influenced by the temperature of the air outside of the cabinet, the same general scheme would be used because, under normal conditions, with the primary switch set for a certain temperature, the food compartment temperature will bear a direct relation to the temperature of the outside or room air. Thus, in order to use this control with the thermostat bulb 64 responsive to outside air, it would merely be necessary to make this auxiliary control less sensitive to changes in temperature and to so adjust this auxiliary control that the nuts 114 and 116 would not engage the primary lever when the temperature within the food compartment was within desirable limits.

This control might also be used as a compensating type of room thermostat wherein the thermostat bulb 60 would be responsive to the temperature of the room and the thermostat bulb 64 would be responsive to outside temperatures.

While the form of embodiment of the invention as herein disclosed, constitutes a preferred form, it is to be understood that other forms might be adopted, all coming within the scope of the claims which follow.

What is claimed is as follows:

1. A control means including an expansible means and snap acting means operated by said expansible means, a second expansible means, and a two-way lost motion connection connected to said first expansible means and operated and moved by said second expansible means, said second expansible means being capable of moving the lost motion connection into engagement with said first expansible means in either expanding or contracting movement.

2. A control means including an expansible means and snap acting means operated by said expansible means, a second expansible means, and a two-way lost motion connection connected to said first expensible means and operated and moved by said second expansible means, said second expansible means being capable of moving the lost motion connection into engagement with said first expansible means in either expanding or contracting movement, said lost motion connection having a sufficient amount of lost motion to permit full operation of the snap acting means without engagement by the lost motion connection with the first expansible means.

3. A control means including an expansible means and snap acting means operated by said expansible means, a control device operated by said snap acting means, a second expansible means, and a two-way lost motion connection connected to said first expansible means and operated and moved by said second expansible means, said second expansible means being capable of moving the lost motion connection into engagement with said first expansible means in either expanding or contracting movement.

4. A control means including an expansible means and snap acting means operated by said expansible means, a control device operated by said expansible means, a second expansible means, and a two-way lost motion connection connected to said first expansible means and operated and moved by said second expansible means, said second expansible means being capable of moving the lost motion connection into engagement with said first expansible means in either expanding or contracting movement.

5. A control means including an expansible means and snap acting means operated by said expansible means, a switch means operated by said snap acting means, a second expansible means, and a two-way lost motion connection connected to said first expansible means and operated and moved by said second expansible means, said second expansible means being capable of moving the lost motion connection into engagement with said first expansible means in either expanding or contracting movement.

6. A control means including an expansible means and a snap acting means operated by said expansible means, a second expansible means, and a two-way lost motion connection connected to said first expansible means and operated and moved by said second expansible means, said second expansible means being capable of moving the lost motion connection into engagement with said first expansible means in either expanding or contracting movement, and means for adjusting the amount of lost motion provided by said lost motion connection.

7. A control for a refrigeration device including an expansible means, a lever operated by the expansible means, control means operated by the lever for controlling the device, and a second expansible means having a rigid follower means provided with abutments on both sides of the lever for engaging the lever to control the movement of the lever, said abutments being located sufficiently close together to engage the lever upon a predetermined change of expansion in either direction of said second expansible means, said lever constituting an operating connection between said control means and both said expansible means.

ALBERT O. GROOMS.